(12) United States Patent
Mitsumata et al.

(10) Patent No.: US 7,441,546 B2
(45) Date of Patent: Oct. 28, 2008

(54) VALVE APPARATUS

(75) Inventors: Naoki Mitsumata, Takahama (JP); Fumiaki Murakami, Okazaki (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/489,505

(22) Filed: Jul. 20, 2006

(65) Prior Publication Data

US 2007/0034819 A1    Feb. 15, 2007

(30) Foreign Application Priority Data

Jul. 28, 2005  (JP) .............................. 2005-219494
Jul. 29, 2005  (JP) .............................. 2005-221968

(51) Int. Cl.
*F02M 51/00*   (2006.01)
*F16K 31/02*   (2006.01)

(52) U.S. Cl. ................ 123/472; 251/129.14; 239/585.1

(58) Field of Classification Search ................ 123/472, 123/458; 251/129.14–129.16; 239/533.11, 239/533.2, 585.1, 585.5

See application file for complete search history.

(56) References Cited

U.S. PATENT DOCUMENTS

| | | | | |
|---|---|---|---|---|
| 3,593,738 A | | 7/1971 | Baerfuss ..................... | 137/109 |
| 3,765,644 A | | 10/1973 | Zeuner ................... | 251/129.02 |
| 4,027,850 A | | 6/1977 | Allen ..................... | 251/129.19 |
| 4,448,168 A | * | 5/1984 | Komada et al. ............. | 123/446 |
| 4,483,485 A | * | 11/1984 | Kamiya et al. ........... | 239/585.4 |
| 4,690,374 A | | 9/1987 | Polach et al. .......... | 251/129.02 |
| 5,556,175 A | | 9/1996 | Hayakawa et al. ........ | 303/119.2 |
| 5,638,791 A | * | 6/1997 | Tsuzuki et al. .............. | 123/467 |
| 5,960,915 A | * | 10/1999 | Nezu et al. ............... | 188/266.6 |
| 6,161,813 A | | 12/2000 | Baumgartner et al. ......... | 251/50 |
| 6,220,275 B1 | | 4/2001 | Nishinosono et al. ....... | 137/238 |
| 6,247,452 B1 | * | 6/2001 | Dittus et al. ................. | 123/459 |
| 6,634,275 B2 | * | 10/2003 | Yamaga et al. ................ | 91/367 |
| 6,976,643 B2 | * | 12/2005 | Hokao .................... | 239/533.12 |
| 2003/0057394 A1 | | 3/2003 | Makino | |
| 2005/0022875 A1 | | 2/2005 | Braeuer et al. ............. | 137/529 |
| 2005/0151104 A1 | | 7/2005 | Goossens et al. ....... | 251/129.19 |

FOREIGN PATENT DOCUMENTS

| | | |
|---|---|---|
| DE | 10027171 A1 | 8/2001 |
| DE | 100 64 169 A1 | 2/2002 |
| GB | 677637 | 8/1951 |
| JP | 2001-182638 | 7/2001 |
| JP | 2001-241371 | 9/2001 |

(Continued)

OTHER PUBLICATIONS

Partial European Search Report dated Oct. 26, 2006.

(Continued)

*Primary Examiner*—Willis R. Wolfe, Jr.
*Assistant Examiner*—Johnny H. Hoang
(74) *Attorney, Agent, or Firm*—Nixon & Vanderhye PC

(57) ABSTRACT

A pushrod is slidably received in a slidably holding guide, which is formed separately from a valve body of a valve apparatus. A clearance is provided between an inner peripheral surface of a small diameter tube portion of the valve body and an outer peripheral surface of the guide. The clearance is provided to absorb deformation of the small diameter tube portion.

13 Claims, 5 Drawing Sheets

FOREIGN PATENT DOCUMENTS

| | | |
|---|---|---|
| JP | 2002-089400 | 3/2002 |
| JP | 2004-11448 | 1/2004 |

OTHER PUBLICATIONS

EPO Extended Search Report dated Dec. 28, 2006.

Chinese Office Action dated Oct. 26, 2007 issued in corresponding Chinese Appln. No. 200610107487.9 with English translation.

European Examination Report dated Feb. 21, 2008 issued in corresponding European Appln. No. 06 117 792.9-1252.

Japanese Official Action dated May 28, 2008 issued in corresponding Japanese Appln. No. 2005-221968 with English translation.

Japanese Official Action dated May 28, 2008 issued in corresponding Japanese Appln. No. 2005-219494 with English translation.

* cited by examiner

US 7,441,546 B2

VALVE APPARATUS

CROSS REFERENCE TO RELATED APPLICATION

This application is based on and incorporates herein by reference Japanese Patent Application No. 2005-219494 filed on Jul. 28, 2005 and Japanese Patent Application No. 2005-221968 filed on Jul.29, 2005.

BACKGROUND OF THE INVENTION

1. Field of the Invention

The present invention relates to a valve apparatus.

2. Description of Related Art

For example, Japanese Unexamined Patent Publication No. 2001-182638 discloses a valve apparatus, which can open and close a flow passage according to a displacement position of a slidable member or which can adjust a flow quantity of fluid that passes the flow passage. One previously proposed valve apparatus of this kind will be described with reference to FIG. 6.

The valve apparatus shown in FIG. 6 is implemented as a pressure reducing valve 111, which is installed to a common rail 101 of a common rail fuel injection system of an internal combustion engine (e.g., a diesel engine). The pressure reducing valve 111 reduces an actual pressure of the common rail 101 when the actual pressure of the common rail 101 exceeds a predetermined pressure.

In the pressure reducing valve 111, a pushrod (a slidable member) 122 is axially slidably supported in a slide hole 128 formed in a valve body 121. A drive arrangement 125, which drives the pushrod 122, includes a spring 141 and an electromagnetic actuator 142. The electromagnetic actuator 142 includes an armature (a slider) 143, a solenoid 146 and a connector 147 with terminals 147a. The armature 143 is fixed to an upper end of the pushrod 122 in FIG. 6 to move integrally with the pushrod 122. The spring 141 urges the armature 143 and the pushrod 122 in the downward direction (a valve closing direction) in FIG. 6. The solenoid 146 magnetically attracts the armature 143 upon receiving electric power through the connector 147, so that the pushrod 122 fixed to the armature 143 is urged in the downward direction in FIG. 6 to seat a ball 123 against a valve seat 138 formed in a seat member 124 and thereby to close a flow passage hole 137 formed in the center of the valve seat 138.

When the ball 123 is lifted away from the valve seat 138 by the fuel pressure in an accumulation chamber 101d of the common rail 101, the flow passage hole 137 is opened. Thus, the high pressure fuel of the accumulation chamber 101d of the common rail 101 is conducted through the flow passage hole 137, a small diameter hole 132, radial holes 133 and a low pressure passage 101c to a lower pressure side (e.g., a fuel tank) of the system.

The previously proposed pressure reducing valve 111 may have the following disadvantage. Specifically, the pressure reducing valve 111 is installed to and is fixed to the common rail 101 when a male threaded portion 134 formed in the outer peripheral surface of the valve body 121 is threadably tightened and is thereby threadably secured to a female threaded portion 101a of the common rail 101. Thus, there is a possibility that the valve body 121 is deformed by the tightening load (the axially compressed load) applied to the valve body 121 by a tool (e.g., a wrench) that is used to install the pressure reducing valve 111 to the common rail 101.

Furthermore, when the common rail 101 is formed by metal casting or is processed in a high temperature environment, the common rail 101 may possibly be deformed in some cases. Thus, when the valve body 121 is strongly and securely tightened against such a deformed common rail 101, the valve body 121 may possibly be deformed due to the deformation of the common rail 101.

When the valve body 121 is deformed in this way, the slide hole 128, which is directly formed in the valve body 121, may be deformed. When this happens, the pushrod 122 may be interfered with the slide hole 128, so that a trouble in the slide movement of the pushrod 122 may possible occur.

Furthermore, when the deformation of the slide hole 128 occurs, the central axis of the pushrod 122 may possibly deviate from the central axis of the valve seat 138 in some cases. When the central axis of the pushrod 122 is deviated from the central axis of the valve seat 138, the seating direction of the ball 123 against the valve seat 138 (the urging direction of the urging force applied to the ball 123) may possibly be deviated from its proper direction. Thus, the leakage through the valve seat 138 may possibly occur even when the ball 123 is seated against the valve seat 138. Also, localized partial wearing may occur at the connection between the ball 123 and the valve seat 138.

Here, it is conceivable to increase a wall thickness of the valve body 121 to limit the deformation of the valve body 121. However, this will disadvantageously result in an increase in both a size and a weight of the pressure reducing valve 111.

The previously proposed pressure reducing valve 111 may also have the following disadvantage. Specifically, when the armature 143 of the electromagnetic actuator 142 is driven in the axial direction, a volume of an armature receiving chamber 148, which is formed in the valve body 121 and slidably receives the armature 143, is changed. In order to promote this volume change of the armature receiving chamber 148 to facilitate the movement of the armature 143 and the pushrod 122, the armature receiving chamber 148 is communicated with an external space, which is external to the armature receiving chamber 148, through a breathing passage.

In the previously proposed pressure reducing valve 111, the armature receiving chamber 148 is communicated with an interior of the small diameter hole 132 (a low pressure side), which is positioned on the upstream side of the valve seat 138, through a slide clearance B between the pushrod 122 and an inner peripheral surface of the slide hole 128. The slide clearance B is relatively narrow in the radial direction and is axially lengthened to limit possible deviation of the central axis of the pushrod 122. Thus, a flow resistance of the fluid (the fuel), which passes the slide clearance B, is relatively large. Therefore, the breathing (the volume change) of the armature receiving chamber 148 may be disadvantageously hindered, and thereby movability (response) of the armature 143 and the pushrod 122 may be disadvantageously limited.

SUMMARY OF THE INVENTION

The present invention addresses the above disadvantages. Thus, it is an objective of the present invention to provide a valve apparatus, which can effectively limit or alleviate a trouble in slide movement of a slidable member even when a valve body is deformed.

To achieve the objective of the present invention, there may be provided a valve apparatus, which includes a valve body, a slidable member, a drive means and a slidably holding guide. The slidable member is slidably supported in the valve body. The drive means is for applying a drive force to the slidable member to move the slidable member in a sliding direction and thereby to open and close a flow passage or to adjust a flow quantity of fluid passing the flow passage. The slidably holding guide is formed separately from the valve body and has a slide surface, which slidably supports the slidable member. The slidably holding guide is positioned such that a clearance is formed between the slidably holding guide and the valve body.

To achieve the objective of the present invention, there may be alternatively provided a valve apparatus, which includes a valve body, a slidable member, a drive means, a valve element, a seat member and a slidably holding guide. The slidable member is axially slidably supported in the valve body. The drive means is for applying an axial drive force to the slidable member. The valve element is provided at a distal end of the slidable member and receives the axial drive force of the slidable member. The seat member has a valve seat against which the valve element is seatable. When the valve element is lifted away from the valve seat, a flow passage hole formed in the valve seat is opened. The slidably holding guide is formed separately from the valve body and has a slide hole that slidably supports the slidable member. The seat member is fitted to an inner peripheral surface of the slidably holding guide in such a manner that a central axis of the seat member generally coincides with a central axis of the slidably holding guide.

The above valve apparatus may be modified as follows. That is, the seat member may be formed integrally with the slidably holding guide in such a manner that a central axis of the seat member generally coincides with a central axis of the slidably holding guide.

Also, the above valve apparatus may be modified as follows. That is, the slidably holding guide may be fitted to an inner peripheral surface of the valve body in such a manner that a central axis of the slidably holding guide generally coincides with a central axis of the valve body.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A valve apparatus according to a first embodiment of the present invention will be described with reference to FIGS. 1 and 2. In the present embodiment, the valve apparatus is implemented as a pressure reducing valve for a common rail of a common rail fuel injection system.

Figure 1:
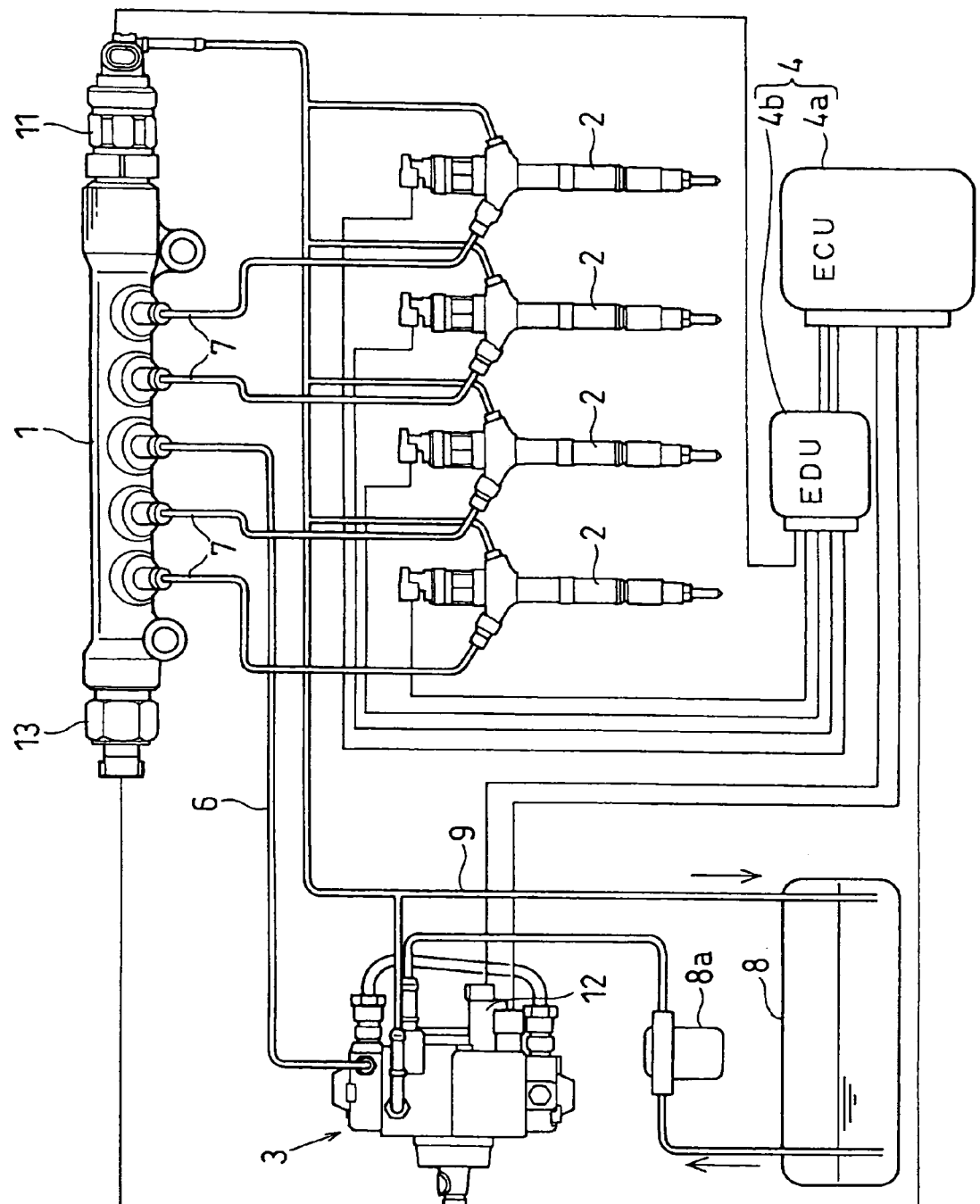
FIG. 1 is a schematic view of a common rail fuel injection system according to a first embodiment of the present invention.

The common rail fuel injection system shown in FIG. 1 is used to inject fuel in a four cylinder internal combustion engine (e.g., a diesel engine not shown). The common rail fuel injection system includes the common rail 1, injectors 2, a supply pump 3 and a control apparatus 4. The control apparatus 4 includes an engine control unit (ECU) 4a and an electronic driving unit (EDU) 4b. Although the ECU 4a and the EDU 4b are provided separately in FIG. 1, the ECU 4a and the EDU 4b may be provided integrally in a single case.

The common rail 1 is an accumulator, which accumulates high pressure fuel to be supplied to the injectors 2. The common rail 1 is connected to an outlet opening of the supply pump 3, which delivers high pressure fuel, through a pump pipe (a high pressure fuel flow passage) 6 to continuously accumulate a rail pressure, which corresponds to a fuel injection pressure. Also, the common rail 1 is connected to a plurality of injector pipes 7, which supply the high pressure fuel to the injectors 2, respectively.

A relief pipe 9 returns fuel from the common rail 1 to a fuel tank 8, and the pressure reducing valve 11 is connected to the relief pipe 9. The pressure reducing valve 11 relieves an actual rail pressure of the common rail 1. Specifically, the pressure reducing valve 11 opens when the actual rail pressure PCi in the common rail 1 is higher than a target rail pressure PC0, which is computed by the ECU 4a, so that the actual rail pressure PCi quickly drops to the target pressure PC0.

The supply pump 3 is a fuel pump, which pumps the high pressure fuel to the common rail 1. The supply pump 3 includes a feed pump and a high pressure pump, which are driven by a common camshaft that is, in turn, driven by the engine. The feed pump draws fuel from the fuel tank 8 through a fuel filter 8a. The high pressure pump compresses the fuel drawn by the feed pump and delivers the compressed fuel to the common rail 1.

The supply pump 3 includes a suction control valve (SCV) 12, which is also sometimes referred to as an intake metering valve. The SCV 12 adjusts a quantity of fuel drawn into the high pressure pump. The control apparatus 4 controls the SCV 12 to adjust the actual rail pressure PCi, which is accumulated in the common rail 1.

The ECU 4a includes a microcomputer of a know architecture, which includes a CPU, a storage device(s) (e.g., a memory, such as a ROM, a SRAM, an EEPROM, a RAM), an input circuit, an output circuit and a power supply circuit. The CPU performs control operations and computing operations. The storage device stores various programs and data. The ECU 4a performs the various computing operations based on signals of sensors (engine parameters: signals corresponding to a driving state of a vehicle occupant, an operational state of the engine and the like) supplied to the ECU 4a.

The sensors, which are connected to the ECU 4a, include a rail pressure sensor 13, an accelerator sensor, an engine rotational speed sensor, a coolant temperature sensor, a fuel temperature sensor and other sensors. The rail pressure sensor 13 senses the actual rail pressure PCi accumulated in the common rail 1 as a measured rail pressure PCk. The accelerator sensor senses an accelerator opening degree (or an operational position of an accelerator pedal). The rotational speed sensor senses the engine rotational speed (rpm). The coolant temperature sensor senses a coolant temperature of the engine. The fuel temperature sensor senses the temperature of the fuel supplied to the injectors 2.

The ECU 4a includes an injection pattern determining means, a target injection quantity computing means and a target injection timing computing means, which are implemented as control programs for controlling the injectors 2 and perform corresponding functions based on the corresponding program stored in the ROM and the sensor signals (the vehicle operational state) supplied to and stored in the RAM. The injection pattern determining mean determines a fuel injection pattern for every fuel injection. The target injection quantity computing means computes the target injection quantity for every fuel injection. The target injection timing computing means computes a fuel injection start time point for every fuel injection.

The injection pattern determining means is a control program that determines the fuel injection pattern (e.g., single fuel injection per cycle, multiple fuel injections per cycle) of the injector 2, which corresponds to the current operational state.

The target injection quantity computing means is a control program that computes the target injection quantity, which corresponds to the current operational state, and then computes an instructional injector drive time period (i.e., a commanded injector drive time period), which is a time period required to achieve the target injection quantity.

The target injection timing computing means is a control program that computes a target injection start time point, which corresponds to the current operational state, and then computes instructional injection timing (i.e., commanded injection timing) for starting fuel injection at the target injection start time point.

The ECU 4a includes a target pressure computing means, an SCV control means and a pressure reducing valve control means, which are implemented as control programs for controlling the actual rail pressure PCi in the common rail 1 and perform corresponding functions based on the corresponding program stored in the ROM and the sensor signals (the vehicle operational state) supplied to and stored in the RAM. The target rail pressure computing means computes the target rail pressure PC0. The SCV control means controls a quantity of electric power to be supplied to the SCV 12 based on the computed target rail pressure PC0. The pressure reducing valve control means computes a quantity of electric power to be supplied to the pressure reducing valve 11 based on the target rail pressure PC0.

The target rail pressure computing means is a program that computes the target rail pressure PC0 based on the current operational state through use of a map or an equation.

The SCV control means is a control program that computes the quantity of electric power to be supplied to the SCV 12. Specifically, the SCV control means computes a required SCV opening degree (a required opening degree of the SCV), which is required to make the measured rail pressure PCk measured with the rail pressure sensor 13 equal to the target rail pressure PC0. Then, the SCV control means causes an SCV drive circuit to generate a valve opening signal (e.g., a PWM signal) that achieves the computed SCV opening degree at the SCV 12.

The pressure reducing valve control means performs two controls, i.e., a valve opening pressure open control and a flow quantity feedback control. In the valve opening pressure open control, the pressure reducing valve control means computes a quantity of electric power to be supplied to the pressure reducing valve 11 through open control. In the flow quantity feedback control, the pressure reducing valve control means computes a quantity of electric power to be supplied to the pressure reducing valve 11 through feedback control.

In the valve opening pressure open control, a valve closing force of the pressure reducing valve 11 is controlled to control a valve opening pressure, at which the pressure reducing valve 11 is shifted from a valve closed state to a valve open state. Specifically, the pressure reducing valve control means computes a required quantity of electric power, which needs to be supplied to the pressure reducing valve 11 to make the valve opening pressure equal to the target rail pressure PC0. Then, the pressure reducing valve control means causes a pressure reducing valve drive circuit provided in the EDU 4b to generate a valve opening pressure setting signal (e.g., a PWM signal) that provides the computed quantity of electric power to the pressure reducing valve 11.

In the flow quantity feedback control, the pressure reducing valve control means computes a required pressure reducing valve opening degree, which is required to make the rail pressure PCk measured with the rail pressure sensor 13 equal to the target rail pressure PC0. Then, the pressure reducing valve control means computes a quantity of electric power to be supplied to the pressure reducing valve 11 to achieve the computed pressure reducing valve opening degree. Then, the pressure reducing valve control means causes the pressure reducing valve drive circuit provided in the EDU 4b to generate a valve opening pressure setting signal (e.g., a PWM signal) that provides the computed quantity of electric power to the pressure reducing valve 11.

The pressure reducing valve control means may use any one of the valve opening pressure open control and the flow quantity feedback control.

Next, a structure of the pressure reducing valve 11 according to the present embodiment will be described with reference to FIG. 2.

The pressure reducing vale 11 includes a valve body (also referred to as a housing) 21, a pushrod (also referred to as a needle and serving as a slidable member of the present invention) 22, a ball (serving as a valve element of the present invention) 23, a seat member 24 and a drive arrangement (serving as a drive means of the present invention) 25.

The valve body 21 is fixed to an end of the common rail (serving as an external fixing member of the present invention, which is external to the valve apparatus of the present invention) 1. The valve body 21 includes a small diameter tube portion (serving as a tube portion of the present invention) 26 and a large diameter tube portion 27. The small diameter tube portion 26 has an outer diameter smaller than that of the large diameter tube portion 27 and is threaded into an interior of the common rail 1 through an opening having a female threaded portion 1a at the end of the common rail 1. The large diameter tube portion 27 receives the drive arrangement 25.

The pressure reducing valve 11 further includes a slidably holding guide 51, which is provided separately from the valve body 21 that may possibly be deformed upon securing, i.e., tightening of the valve body 21 against the common rail 1. The guide 51 has a slide hole (an inner peripheral surface of the slide hole serving as a slide surface of the present invention) 28 that axially slidably supports the pushrod 22 and extends in the axial direction in such a manner that the central axis of the slide hole 28 generally coincides with the central axis of the guide 51. The guide 51 is formed into a tubular body and has a clearance C, which is formed on a radially outer side of at least the slide hole 28 and is radially defined between the inner peripheral surface of the valve body 21 and an outer peripheral surface of the guide 51.

A guide insertion hole 52 is formed in the valve body 21 to extend axially in the valve body 21. The guide insertion hole 52 is a cylindrical hole, which is generally coaxial with the valve body 21. A large diameter hole 31 is formed in the lower end of the valve body 21 in FIG. 2. The large diameter hole 31 axially extends in a distal end of the small diameter tube portion 26. The seat member 24, which forms a valve seat 38 (described below in detail), is received in the large diameter hole 31. The large diameter hole 31 is a cylindrical hole, which is generally coaxial with the valve body 21 (the small diameter tube portion 26). An outer diameter of the seat member 24, which has a generally circular disk shape, coincides with an inner diameter of the large diameter hole 31. When the seat member 24 is fitted to the inner peripheral surface of the large diameter hole 31, the central axis of the valve seat 38, which is formed in the seat member 24, generally coincides with the central axis of the slide hole 28. Furthermore, the central axis of the seat member 24 received in the large diameter hole 31 generally coincides with the central axis of the valve body 21. A distal end peripheral wall of the valve body 21 is bent radially inward to securely hold the seat member 24 in the valve body 21.

A centering outer tube portion (a centering outer flange) 53, which is cylindrical, is formed at an outer peripheral part of a lower end of the guide 51. The centering outer tube portion 53 is received in the interior of the large diameter hole 31 and has an outer diameter, which coincides with the inner diameter of the large diameter hole 31. The central axis of the centering outer tube portion 53 generally coincides with the central axis of the guide 51. When the centering outer tube portion 53 is fitted to the inner peripheral surface of the large diameter hole 31, the guide 51 is placed such that the central axis of the guide 51 generally coincides with the central axis of the valve body 21 (the small diameter tube portion 26).

Furthermore, a small diameter hole 32 is formed in an inner peripheral part of a lower end (a bottom end) of the guide 51. The small diameter hole 32, which has an inner diameter that is smaller than that of the large diameter hole 31, axially extends at the bottom end of the guide 51 on a lower side of the slide hole 28 in FIG. 2. The small diameter hole 32 is a cylindrical hole that is generally coaxial with the valve body 21 (the small diameter tube portion 26) and receives fuel, which has passed through a flow passage hole 37 (described below) formed in the seat member 24.

Furthermore, a communication passage 54 is formed in the guide 51. The communication passage 54 includes two interior-exterior communication holes 54a and an annular groove 54b. The interior-exterior communication holes 54a radially extend through the peripheral wall of the guide 51 and are communicated with the interior of the small diameter hole 32. The annular groove 54b is recessed along the outer peripheral surface of the guide 51 to extend all around the guide 51 and is communicated with the interior-exterior communication holes 54a. Radial holes 33 extend radially through the peripheral wall of the small diameter tube portion 26. The radial holes 33 communicate between the communication passage 54 and a low pressure passage 1c of a pipe joint 1b, which is formed in the common rail 1 and is connected with the relief pipe 9. In FIG. 2, although the central axis of each radial hole 33 is displaced from the central axis of the radially opposed interior-exterior communication hole 54a, the central axis of each radial hole 33 may be placed to coincide with the central axis of the radially opposed interior-exterior communication hole 54a to allow smooth flow of the fuel between them, like in the following embodiments (see FIGS. 3 to 5).

A centering inner tube portion 55, which is shaped into a cylindrical body, is formed in the seat member 24. The centering inner tube portion 55 is inserted into the interior of the small diameter hole 32 and has an outer diameter, which coincides with the inner diameter of the small diameter hole 32. The central axis of the centering inner tube portion 55 generally coincides with the central axis of the valve seat 38 of the seat member 24. When the centering inner tube portion 55 is fitted to the inner peripheral surface of the small diameter hole 32, the central axis of the valve seat 38 generally coincides with the central axis of the guide 51.

That is, the centering inner tube portion 55 of the seat member 24 is fitted to the inner peripheral surface of the small diameter hole 32 of the guide 51, so that the central axis of the slide hole 28 generally coincides with the central axis of the valve seat 38. Furthermore, the central axis of the slide hole 28, the central axis of the valve seat 38 and the central axis of the valve body 21 generally coincide with each other when the centering outer tube portion 53 of the guide 51 is fitted to the inner peripheral surface of the large diameter hole 31 of the valve body 21.

Figure 2:
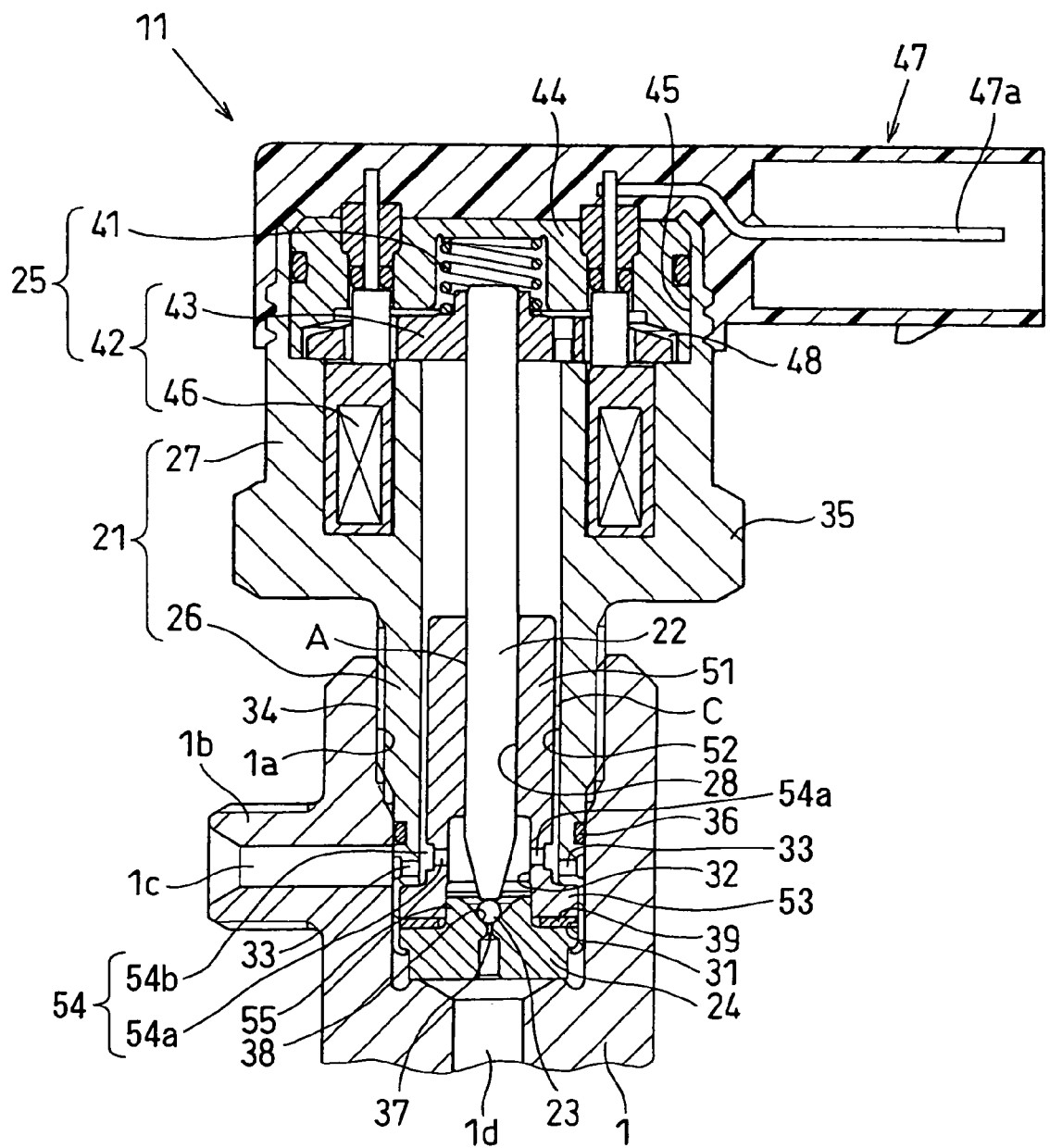
FIG. 2 is a cross sectional view of a pressure reducing valve for the common rail fuel injection system according to the first embodiment.

After installation of the guide 51, an annular disk shaped adjusting shim 39 (described below) and the seat member 24 to the valve body 21, the distal end peripheral wall of the valve body 21 in FIG. 2 is bent radially inward, as described above. Thereby, the guide 51, the adjusting shim 39 and the seat member 24 are fixed to the valve body 21.

The guide 51 is fixed to the valve body 21 only by the centering outer tube portion 53 formed at the lower end of the guide 51 in FIG. 2. The rest of the guide 51, which is other than the centering outer tube portion 53 and is inserted into the guide insertion hole 52 without contacting the inner peripheral wall surface of the guide insertion hole 52, is spaced apart from the valve body 21 by the clearance C.

A male threaded portion (serving as a fixing portion of the present invention) 34 is formed in an outer peripheral surface of the small diameter tube portion 26 at an upper side (a side close to the large diameter tube portion 27) of the small diameter tube portion 26 in FIG. 2 to threadably engage with the female threaded portion 1a formed in the opening at the end of the common rail 1. A tool engaging portion (e.g., a hexagonal portion) 35 is formed in the large diameter tube portion 27 to engage with a tool (e.g., a wrench) that is used to install the pressure reducing valve 11 to the common rail 1. The clearance C is positioned radially inward of the male threaded portion 34. In the drawing, numeral 36 indicates an 0-ring, which limits outward leakage of high pressure fuel through a space between the common rail 1 and the small diameter tube portion 26.

The pushrod 22 is a solid cylindrical shaft, which is axially slidably supported by the inner peripheral surface of the slide hole 28 of the guide 51. The pushrod 22 serves as a conducting member, which conducts an urging force of the drive arrangement 25, which is exerted in the valve closing direction, to the ball 23. An armature 43 of the drive arrangement 25 described below is fixed to an upper part of the pushrod 22 in FIG. 2.

The ball 23 is placed at the distal end of the pushrod 22. The ball 23 is urged downward in FIG. 2 by a flat surface portion (a ball urging surface), which is formed at the distal end of the pushrod 22, so that the ball 23 is seated against the valve seat 38 of the seat member 24. In this instance, the ball 23, which is located at the distal end of the pushrod 22, is seated against and is lifted away from the valve seat 38. However, in some cases, the ball 23 may be eliminated, and a valve element may be directly and integrally formed in the distal end of the pushrod 22. In such a case, the pushrod 22 is directly seated against and is lifted away from the valve seat 38.

The flow passage hole 37 (an example of flow passage, such as an orifice that forms a high pressure fuel passage) is formed in the center of the seat member 24 to conduct the high pressure fuel of the common rail 1 into the interior of the small diameter hole 32.

The valve seat 38 is formed around the upstream end (an upper end in FIG. 2) of the flow passage hole 37 and is tapered toward the flow passage hole 37. The flow passage hole 37 is closed when the ball 23 is seated against the valve seat 38. When the ball 23 is lifted away from the valve seat 38, the flow passage hole 37 is opened. Thus, the high pressure fuel of an accumulation chamber 1d of the common rail 1 is conducted through the flow passage hole 37, the small diameter hole 32, the communication passage 54, the radial holes 33, the low pressure passage 1c and the relief pipe 9 in this order.

When the valve body 21 is securely fixed to the common rail 1, i.e., is securely tightened against the common rail 1, the seat member 24 is strongly urged against an annular protrusion having a trapezoidal cross section. In this way, it is possible to limit direct flow of the fuel to the low pressure passage 1c through a space between the seat member 24 and the common rail 1 without passing through the flow passage hole 37.

The annular disk shaped adjusting shim 39 is axially positioned between the seat member 24 and the guide 51 (more specifically, the centering outer tube portion 53 of the guide 51). The adjusting shim 39 is provided to adjust a lift amount of the pushrod 22 and the ball 23, which constitute a valve movable part. Furthermore, the shim 39 is formed as an annular disk shaped seal packing, which limits leakage of fuel into the interior of the small diameter hole 32 through a space between the seat member 24 and the valve body 21.

The drive arrangement 25 applies the drive force, i.e., the urging force (a valve closing force) to the ball 23 through the pushrod 22 in the valve closing direction. The drive arrangement 25 includes a spring (a spring means) 41 and an electromagnetic actuator 42.

The spring 41 is a compression coil spring, which is compressed between the armature 43, which is fixed to the upper part of the pushrod 22 in FIG. 2, and an upper body 44, which is installed to the upper part of the large diameter tube portion 27. The spring 41 urges the armature 43 in the valve closing direction to apply the urging force to the ball 23 in the valve closing direction through the pushrod 22.

A drive arrangement receiving hole 45, which receives the drive arrangement 25, is formed in the upper part of the large diameter tube portion 27 to extend in the axial direction. The drive arrangement receiving hole 45 is a cylindrical hole, which is generally coaxial with the valve body 21 (the large diameter tube portion 27). After installation of the respective components into the drive arrangement receiving hole 45, an upper end peripheral wall (a proximal end peripheral wall) of the valve body 21 is radially inwardly bent against the upper body 44, so that the upper body 44 is fixed to the valve body 21.

The electromagnetic actuator 42 includes the armature (a slider) 43, a solenoid 46 and a connector 47. The solenoid 46 magnetically attracts the armature 43, and electric power is supplied from the connector 47 to the solenoid 46.

The armature 43 is a magnetic member (e.g., a ferromagnetic material, such as iron), which is shaped into a generally circular disk form and is fixed to the upper part of the pushrod 22 in FIG. 2. The armature 43 is axially slidable for a predetermined distance in a space (an armature receiving chamber 48) between the valve body 21 and the upper body 44.

The solenoid 46 magnetically attracts the armature 43 in the axial direction to change the axial drive force, i.e., the axial displacement force, which is applied to the pushrod 22. Specifically, the solenoid 46 shown in FIG. 2 is received in the valve body 21 on the lower side of the armature 43 in FIG. 2 and magnetically attracts the armature 43 in the valve closing direction according to the quantity of electric power supplied to the solenoid 46.

The connector 47 is a connecting means for electrically connecting with the EDU 4b (specifically, the pressure reducing valve drive circuit) through an electrical connection line. Specifically, the connector 47 is formed as a resin-molded connecting element that is installed to the upper part of the large diameter tube portion 27 and that has connector terminals 47a, which are molded in the resin body of the connecting element and are connected to the solenoid 46 (specifically to ends of a coil that includes an insulation coating and is wound many times).

As described above, in the electromagnetic actuator 42, when the electric power is supplied to the solenoid 46, the armature 43 is magnetically attracted in the valve closing direction due the magnetic force generated by the solenoid 46. When the electric power, which is applied to the solenoid 46, is increased, the urging force applied to the pushrod 22 and the ball 23 in the valve closing direction is increased.

Specifically, in the pressure reducing valve 11 shown in FIG. 2, when the quantity of electric power supplied to the solenoid 46 is relatively small, the urging force in the valve closing direction is reduced, and thereby the valve opening pressure of the pressure reducing valve 11 is set to be relatively low. In contrast, when the quantity of electric power supplied to the solenoid 46 is relatively large, the urging force in the valve closing direction is increased, and thereby the valve opening pressure of the pressure reducing valve 11 is set to be relatively high.

Here, it should be noted that in place of the pressure reducing valve 11 shown in FIG. 2, it is possible to use another type of pressure reducing valve 11, in which the urging force in the valve closing direction is reduced when the quantity of electric power supplied to the solenoid 46 is increased.

Next, an exemplary operation of the pressure reducing valve 11, which is controlled through the valve pressure open control, will be described.

When the actual pressure PCi in the common rail 1 is increased beyond the valve opening pressure (the target rail pressure PC0) of the pressure reducing valve 11, which is set by the ECU 4a, the valve opening force, which is applied to the ball 23 through the flow passage hole 37, overcomes the valve closing force (the sum of the force of the spring 41 and the magnetic attractive force of the electromagnetic actuator 42), which is exerted by the drive arrangement 25 to urge the ball 23 against the valve seat 38. Thus, the ball 23 is lifted away from the valve seat 38. Then, the fuel in the common rail 1 is returned to the fuel tank 8 through the flow passage hole 37, the small diameter hole 32, the communication passage 54, the radial holes 33 and the relief pipe 9 in this order. As described above, the fuel in the common rail 1 is drained through the pressure reducing valve 11, so that the actual rail pressure PCi is reduced.

Then, when the actual rail pressure PCi in the common rail 1 is reduced to the valve opening pressure (the target rail pressure PC0) of the pressure reducing valve 11, the valve closing force, which is applied from the drive arrangement 25 to urge the ball 23 against the valve seat 38, overcomes the valve opening force, which is applied to the ball 23 through the flow passage hole 37. Thus, the ball 23 is seated against the valve seat 38. As a result, the actual pressure PCi is maintained at the valve opening pressure (the target rail pressure PC0) of the pressure reducing valve 11.

In a case where the target rail pressure PC0 is increased, the quantity of electric power supplied to the pressure reducing valve 11 is increased through the open control. Thus, the valve closing force of the pressure reducing valve 11 is increased, and thereby the valve opening pressure of the pressure reducing valve 11 is changed to the increased target rail pressure PC0. At this time, due to the increase in the target rail pressure PC0, the valve opening degree of the SCV 12 is controlled to a larger value, and thereby the delivery quantity of the supply pump 3 (the high pressure pump) is increased.

In a case where the target rail pressure PC0 is decreased, the quantity of electric power supplied to the pressure reducing valve 11 is reduced through the open control. Thus, the valve closing force of the pressure reducing valve 11 is reduced, and thereby the valve opening pressure of the pressure reducing valve 11 is changed to the decreased target rail pressure PC0. At this time, due to the decrease in the target rail pressure PC0, the valve opening degree of the SCV 12 is controlled to a smaller value, and thereby the delivery quantity of the supply pump 3 (the high pressure pump) is reduced.

The actual rail pressure PCi is still larger than the valve opening pressure (the target rail pressure PC0) immediately after the drop of the target rail pressure PC0, so that the pressure reducing valve 11 opens immediately to rapidly reduce the pressure in the common rail 1 to the target rail pressure PC0.

Then, when the actual rail pressure PCi is decreased to the target rail pressure PC0, the pressure reducing valve 11 closes immediately.

Now, advantages of the first embodiment will be described.

As described above, in the pressure reducing valve 11 of the first embodiment, the guide 51 is provided separately from the valve body 21, and the clearance C is provided between the small diameter tube portion 26, which is located radially inward of the male threaded portion 34 (the fixing portion), and the guide 51.

Thus, even when the deformation of the small diameter tube portion 26, which is located radially inward of the male threaded portion 34, occurs due to the tightening of the valve body 21 against the common rail 1, the deformation of the small diameter tube portion 26 is absorbed by the clearance C and is not conducted to the slide hole 28. As a result, the pushrod 22 can smoothly slide in the slide hole 28 without having a trouble in terms of the slide movement of the pushrod 22. Specifically, the deformation of the valve body 21 is limited, and therefore it is not required to increase the wall thickness of the valve body 21. As a result, the size and weight of the pressure reducing valve 11 are not disadvantageously increased.

Furthermore, according to the first embodiment, even when the valve body 21 is deformed due to the fixation of the valve body 21 to the common rail 1, the central axis of the seat member 24 can be still maintained to generally coincide with the central axis of the guide 51, which is formed separately from the valve body 21. Thus, deviation of the central axis of the slide hole 28, i.e., the central axis of the pushrod 22 from the central axis of the valve seat 38 can be advantageously limited.

In this way, it is possible to limit occurrence of deviation in the valve seating direction of the ball 23 against the valve seat 38 (the urging direction of the urging force applied to the ball 23). Therefore, the leakage from the valve seat 38 at the time of seating the ball 23 against the valve seat 38 can be advantageously limited, and the localized partial wearing at the connection between the ball 23 and the valve seat 38 can be limited.

Also, the clearance C communicates with the radial holes 33 and the communication passage 54 at the low pressure side and is used as the breathing passage of the armature receiving chamber 48. As described above, the clearance C absorbs the deformation of the valve body 21. Furthermore, the clearance C is made as an annular clearance, and the clearance C is larger than a slide clearance A, which is formed between the inner peripheral surface of the slide hole 28 and the outer peripheral surface of the pushrod 22 and is positioned radially inward of the clearance C. More specifically, a radial size of the clearance C, which is measured in a direction perpendicular to the central axis of the pushrod 22, is larger than that of the slide clearance A. Thus, a passage cross sectional area of the clearance C is larger than a passage cross sectional area of the slide clearance A. As a result, the flow resistance in the clearance C becomes smaller than that of the slide clearance A, and thereby a flow velocity of the fluid in the breathing passage defined by the clearance C is increased. Therefore, the breathing (the volume change) of the armature receiving chamber 48, which is induced by the displacement of the armature 43, becomes easier. In this way, the movability (the response) of the armature 43 and the pushrod 22 is improved, so that the pressure reducing valve 11, which achieves the quick response, can be provided.

Second Embodiment

A second embodiment of the present invention will be described with reference to FIG. 3. In each of the following embodiments, components similar to those of the first embodiment will be indicated by the same numerals and will not be described further. In the following description, only the differences with respect to the first embodiment will be described.

In the first embodiment, the male threaded portion (the fixing portion) 34, which is provided to the outer peripheral surface of the small diameter tube portion 26 of the valve body 21, is meshed with the female threaded portion 1a, which is provided to the end of the common rail 1. In this way, the pressure reducing valve 11 is fixed to the common rail 1.

In contrast to the first embodiment, in the second embodiment, a press-fit hole 1e is formed in the end of the common rail 1. The smooth outer peripheral surface of the small diameter tube portion 26 is press fitted into the press-fit hole 1e. A connection between the common rail 1 and the valve body 21 is welded by a well know welding technique at a welding portion 57. In this way, the pressure reducing valve 11 is fixed to the common rail 1.

Since the outer peripheral surface of the small diameter tube portion 26 needs to be press fitted into the press-fit hole 1e, the outer diameter of the small diameter tube portion 26 is made slightly larger than the inner diameter of the press-fit hole 1e. A press-fit surface 56, which is provided in the outer peripheral surface of the small diameter tube portion 26, and the welding portion 57, which forms the above weld, correspond to a fixing portion of the pressure reducing valve 11, which is fixed to the common rail 1.

As described above, the pressure reducing valve 11 is fixed to the common rail 1 by the press fitting and the welding. Thus, the applied radial load, which is caused by the press fitting, and the applied heat, which is caused by the welding, may possibly induce deformation of the small diameter tube portion 26, which is located radially inward of the fixing portion (the press-fit surface 56 and the welding portion 57).

However, the clearance C is provided between the guide 51 and the small diameter tube portion 26, which is located radially inward of the fixing portion (the press-fit surface 56 and the welding portion 57). Thus, even when the deformation of the small diameter tube portion 26, which is located radially inward of the fixing portion (the press-fit surface 56 and the welding portion 57), occurs, the deformation is absorbed by the clearance C and thereby will not cause deformation of the slide hole 28. As a result, advantages similar to those of the first embodiment can be achieved.

Third Embodiment

Figure 4:
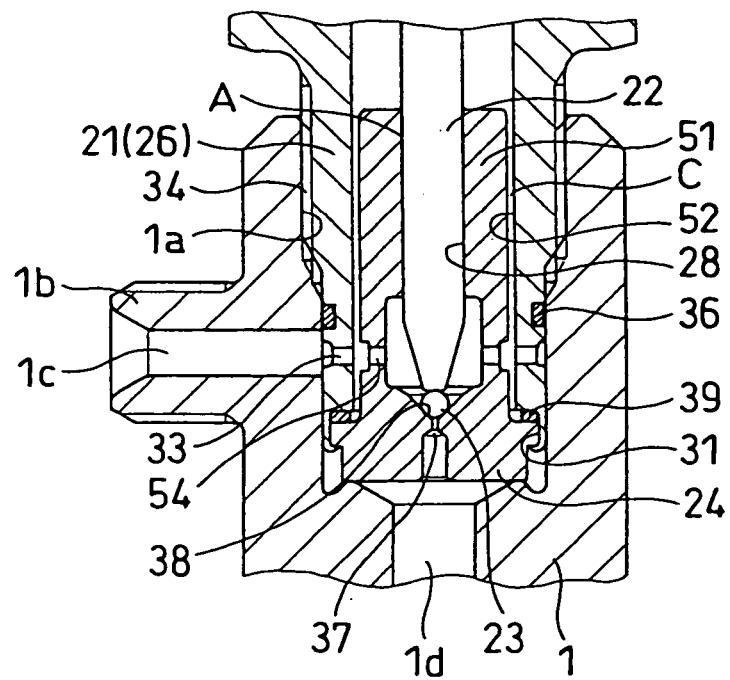
FIG. 4 is a partial cross sectional view of a pressure reducing valve according to a third embodiment of the present invention.

A third embodiment of the present invention will be described with reference to FIG. 4.

In the first embodiment, the guide 51 and the seat member 24 are provided separately, and the seat member 24 is installed to the inner peripheral surface of the guide 51, so that the central axis of the slide hole 28 of the guide 51 generally coincides with the central axis of the valve seat 38 of the seat member 24.

In contrast to this, according to the third embodiment, the seat member 24 is formed integrally with the guide 51 such that the seat member 24 is generally coaxial with the guide 51. Specifically, the guide 51 and the seat member 24 are formed integrally, and central axis of the slide hole 28 generally coincides with the central axis of the valve seat 38.

In this way, advantages similar to those of the first embodiment can be achieved.

Furthermore, the number of components can be advantageously reduced, and thereby an increase in the manufacturing costs can be limited.

Fourth Embodiment

Figure 5:
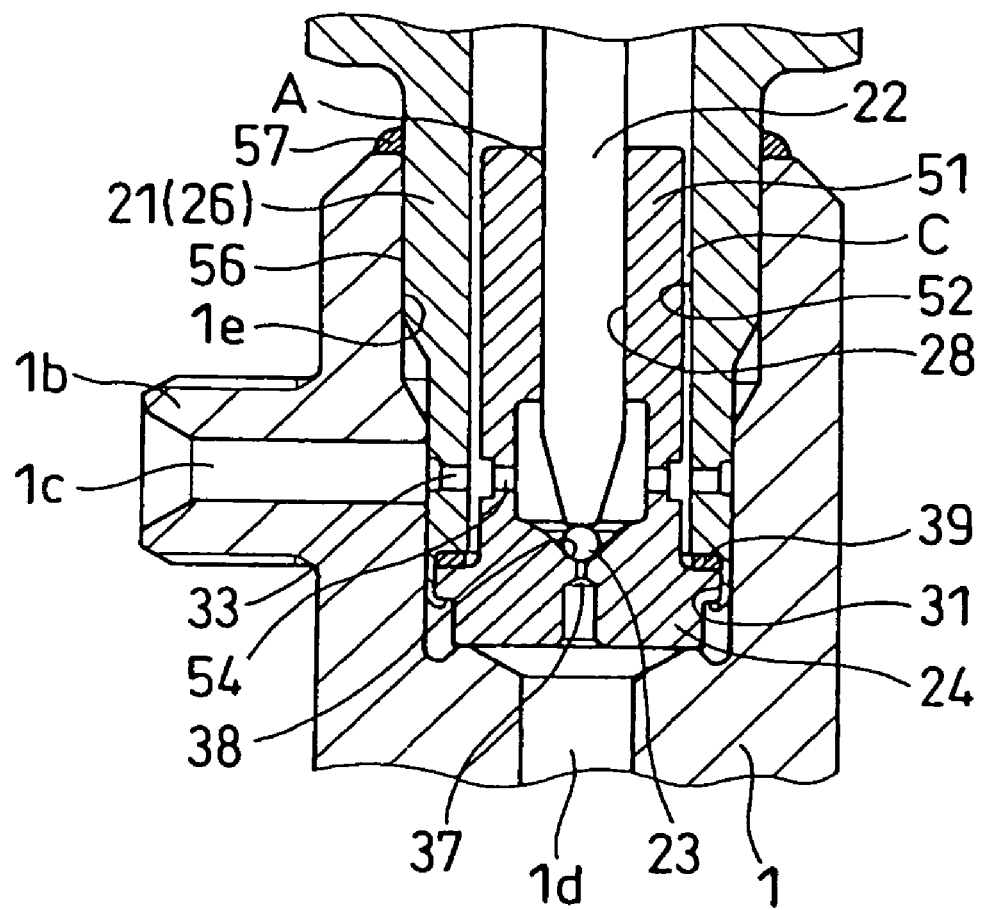
FIG. 5 is a partial cross sectional view of a pressure reducing valve according to a fourth embodiment of the present invention.
Figure 6:
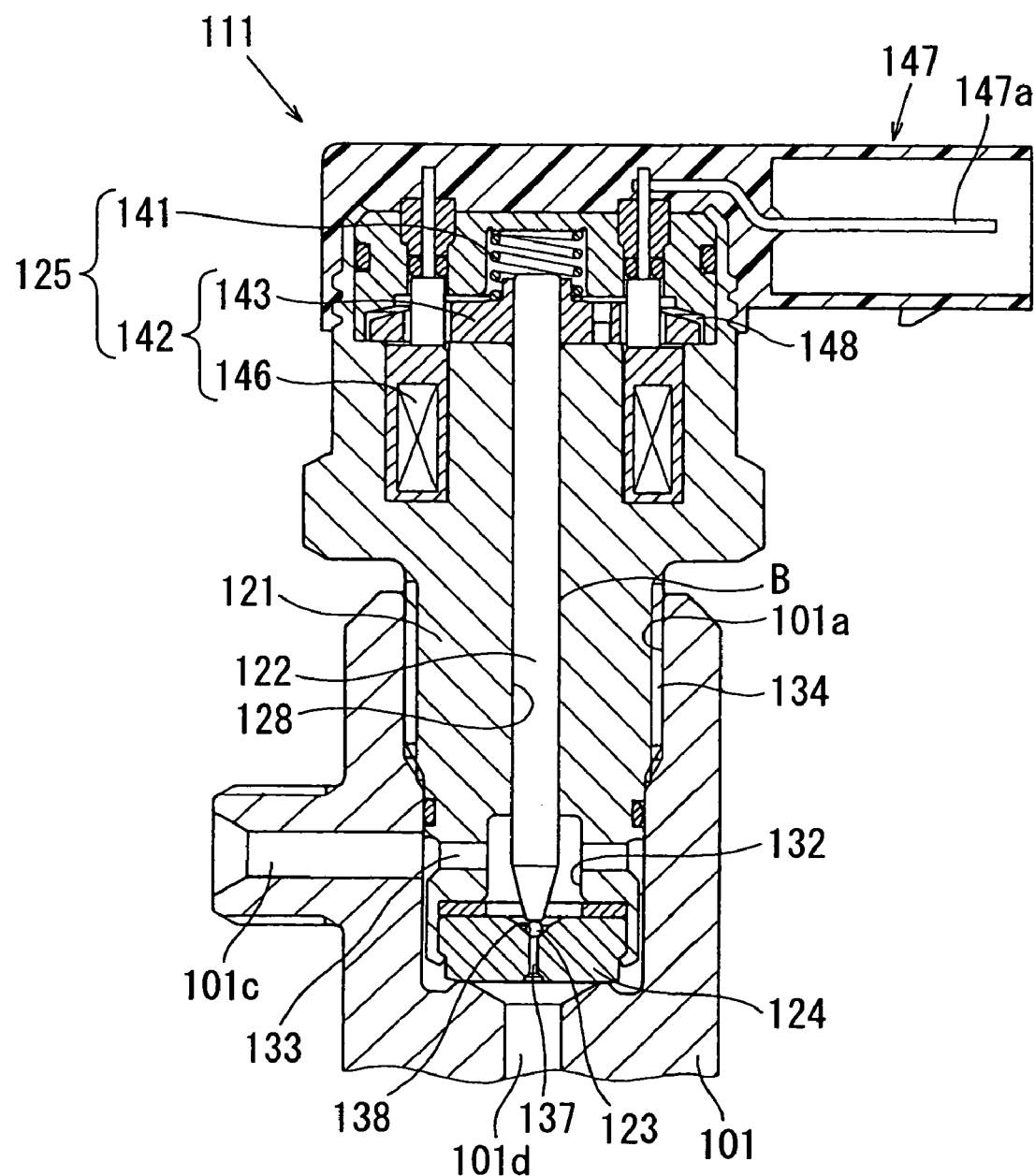
FIG. 6 is a cross sectional view of a previously proposed pressure reducing valve.

A fourth embodiment of the present invention will be described with reference to FIG. 5. The fourth embodiment is a modification of the third embodiment, in which the guide 51 and the seat member 24 are formed integrally.

In the third embodiment, the male threaded portion (the fixing portion) 34, which is provided to the outer peripheral surface of the small diameter tube portion 26 of the valve body 21, is meshed with the female threaded portion 1a, which is provided to the end of the common rail 1. In this way, the pressure reducing valve 11 is fixed to the common rail 1.

Figure 3:
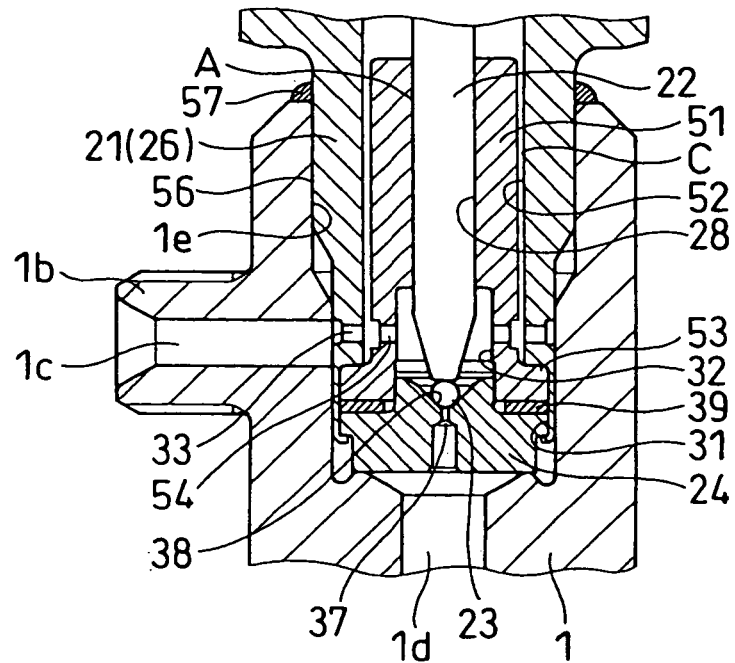
FIG. 3 is a partial cross sectional view of a pressure reducing valve according to a second embodiment of the present invention.

In contrast to the third embodiment, in the fourth embodiment, a press-fit hole 1e is formed in the end of the common rail 1 like in the second embodiment shown in FIG. 3. The outer peripheral surface of the small diameter tube portion 26 is press fitted into the press-fit hole 1e. A connection between the common rail 1 and the valve body 21 is welded by a well know welding technique at a welding portion 57. In this way, the pressure reducing valve 11 is fixed to the common rail 1.

Since the outer peripheral surface of the small diameter tube portion 26 needs to be press fitted into the press-fit hole 1e, the outer diameter of the small diameter tube portion 26 is made slightly larger than the inner diameter of the press-fit hole 1e. A press-fit surface 56, which is provided in the outer peripheral surface of the small diameter tube portion 26, and the welding portion 57, which forms the above weld, correspond to a fixing portion of the pressure reducing valve 11, which is fixed to the common rail 1.

In this way, advantages similar to those of the first to third embodiments can be achieved.

Now, modifications of the above embodiments will be described.

In the above embodiments, the electromagnetic actuator 42 is used as the exemplary actuator of the drive arrangement 25. Alternatively, any other suitable actuator may be used. For example, the urging force of the spring 41 may be adjusted by an amount of rotation of a step motor or by a piezoactuator.

In the above embodiments, the present invention is implemented in the valve apparatus (specifically, the pressure reducing valve 11), which adjusts the valve opening pressure or the flow quantity. Alternatively, the present invention is equally applicable to any other suitable valve apparatus, in which valve opening and valve closing are controlled.

In the above embodiments, the guide 51 slidably holds the pushrod 22. Alternatively, the guide 51 may slidably hold a valve element (e.g., a spool of a spool valve).

In the above embodiments, the guide 51 axially slidably holds the slidable member (the pushrod 22 in the above embodiments). Alternatively, the guide 51 may slidably support the slidable member in a rotational direction. Specifically, the slidable member may be a rotatable body, such as a rotary valve.

Additional advantages and modifications will readily occur to those skilled in the art. The invention in its broader terms is therefore not limited to the specific details, representative apparatus, and illustrative examples shown and described.

What is claimed is:

1. A valve apparatus comprising:
   a valve body;
   a slidable member that is disposed in and slidably supported in the valve body;
   a drive means for applying a drive force to the slidable member to move the slidable member in a sliding direction and thereby to open and close a flow passage or to adjust a flow quantity of fluid passing the flow passage; and
   a slidably holding guide that is formed separately from the valve body and has a slide surface, which slidably supports the slidable member, wherein the slidably holding guide is positioned such that a radial clearance is formed between the slidably holding guide and the valve body, wherein
   the valve body includes a threaded portion located radially outside of said radial clearance formed between the slidably holding guide and the valve body, and
   said radial clearance has a radial dimension larger than a slide clearance formed between an outer peripheral surface of said slidable member and an inner peripheral slide surface of the slidably holding guide and defined radially inside from said radial clearance.

2. The valve apparatus according to claim 1, wherein:
   the valve body includes a tubular portion, which includes a fixing portion that is formed in an outer peripheral surface of the tubular portion and is fixed to an external fixing member; and
   the clearance is positioned radially inward of the fixing portion.

3. The valve apparatus according to claim 1, wherein:
   the slidably holding guide is shaped into a tubular body, which has an inner peripheral surface that forms the slide surface to slidably support the slidable member; and
   the clearance is positioned radially outward of the slide surface of the slidably holding guide.

4. The valve apparatus according to claim 1, wherein the valve apparatus is a pressure reducing valve, which is fixed to a common rail that accumulates high pressure fuel in a common rail fuel injection system such that the pressure reducing valve relieves an actual rail pressure of the common rail.

5. The valve apparatus according to claim 1, wherein the clearance is an annular clearance and is located between an outer peripheral surface of the slidably holding guide and an inner peripheral surface of the valve body and has a larger radial size in comparison to a slide clearance, which is formed between an outer peripheral surface of the slidable member and the slide surface of the slidably holding guide and is positioned radially inward of the annular clearance.

6. A valve apparatus comprising:
a valve body;
a slidable member that is disposed in and axially slidably supported in the valve body;
a drive means for applying an axial drive force to the slidable member;
a valve element that is provided at a distal end of the slidable member and receives the axial drive force of the slidable member;
a seat member that has a valve seat against which the valve element is seatable, wherein when the valve element is lifted away from the valve seat, a flow passage hole formed in the valve seat is opened; and
a slidably holding guide that is formed separately from the valve body and has a slide hole that slidably supports the slidable member, wherein the seat member is fitted to an inner peripheral surface of the slidably holding guide in such a manner that a central axis of the seat member generally coincides with a central axis of the slidably holding guide, wherein.
said slide hole has a slide surface which slidably supports said slidable member,
the slidably holding guide is positioned such that a radial clearance is formed between the slidably holding guide and the valve body,
the valve body includes a threaded portion located radially outside of said radial clearance formed between the slidably holding guide and the valve body, and
said radial clearance has a radial dimension larger than a slide clearance formed between an outer peripheral surface of said slidable member and an inner peripheral slide surface of the slidably holding guide and defined radially inside from said radial clearance.

7. The valve apparatus according to claim 6, wherein the slidably holding guide is fitted to an inner peripheral surface of the valve body in such a manner that the central axis of the slidably holding guide generally coincides with a central axis of the valve body.

8. The valve apparatus according to claim 6, wherein the valve apparatus is a pressure reducing valve, which is fixed to a common rail that accumulates high pressure fuel in a common rail fuel injection system such that the pressure reducing valve relieves an actual rail pressure of the common rail.

9. The valve apparatus according to claim 1, wherein the slidable member is axially slidably supported in the valve body, the drive means applies an axial drive force to the slidable member, and the slide surface of the slidably holding guide is a slide hole, and further comprising:
a valve element provided at a distal end of the slidable member and receives the axial drive force of the slidable member; and
a seat member that has a valve seat against which the valve element is seatable, wherein when the valve element is lifted away from the valve seat, a flow passage hole formed in the valve seat is opened,
wherein the seat member is formed integrally with the slidably holding guide in such a manner that a central axis of the seat member generally coincides with a central axis of the slidably holding guide.

10. The valve apparatus according to claim 9, wherein the slidably holding guide is fitted to an inner peripheral surface of the valve body in such a manner that the central axis of the slidably holding guide generally coincides with a central axis of the valve body.

11. The valve apparatus according to claim 9, wherein the valve apparatus is a pressure reducing valve, which is fixed to a common rail that accumulates high pressure fuel in a common rail fuel injection system such that the pressure reducing valve relieves an actual rail pressure of the common rail.

12. The valve apparatus according to claim 1, wherein the slidable member axially slidably supported in the valve body, the drive means applies an axial drive force to the slidable member, and the slide surface of the slidably holding guide is a slide hole, and further comprising:
a valve element provided at a distal end of the slidable member and receives the axial drive force of the slidable member; and
a seat member that has a valve seat against which the valve element is seatable, wherein when the valve element is lifted away from the valve seat, a flow passage hole formed in the valve seat is opened,
wherein the slidably holding guide is fitted to an inner peripheral surface of the valve body in such a manner that a central axis of the slidably holding guide generally coincides with a central axis of the valve body.

13. The valve apparatus according to claim 12, wherein the valve apparatus is a pressure reducing valve, which is fixed to a common rail that accumulates high pressure fuel in a common rail fuel injection system such that the pressure reducing valve relieves an actual rail pressure of the common rail.

* * * * *